_US005400415A_

United States Patent [19]

Kobayashi

[11] Patent Number: 5,400,415
[45] Date of Patent: Mar. 21, 1995

[54] BINARIZING METHOD AND APPARATUS THEREFOR

[75] Inventor: Akira Kobayashi, Osaka, Japan

[73] Assignee: Matsushita Electric Industrial Co., Ltd., Osaka, Japan

[21] Appl. No.: 873,212

[22] Filed: Apr. 24, 1992

[30] Foreign Application Priority Data

Apr. 26, 1991 [JP] Japan .................................. 3-097196

[51] Int. Cl.$^6$ .............................................. G06K 9/38
[52] U.S. Cl. ........................................ 382/51; 382/18
[58] Field of Search ................... 382/50, 51, 18, 52, 382/53; 358/455, 456, 457

[56] References Cited

U.S. PATENT DOCUMENTS 5,003,616  3/1991  Orita et al. .............................. 382/41
5,166,986  11/1992  Mizuoka et al. ......................... 382/51

*Primary Examiner*—Leo H. Boudreau
*Assistant Examiner*—Matthew C. Bella
*Attorney, Agent, or Firm*—Wenderoth, Lind & Ponack

[57] ABSTRACT

A binarizing method for converting an image picked up by a television camera into a binary image based on a binarization level used as a threshold, includes a first step of finding a maximum value and a minimum value of a density of the image picked up, a second step of creating a histogram of the density of the image and dividing the histogram into a first region and a second region based on the maximum and minimum values of the density of the image and a predetermined first division ratio, a third step of calculating an average density of each of the first region and the second region, a fourth step of deciding a binarization level based on the average density of each of the first and second regions and a second division ratio, a fifth step of binarizing the image based on the binarization level obtained in the fourth step, a sixth step of detecting a pattern by means of a binarized image obtained in the fifth step, and a seventh step of altering the binarization level by a predetermined degree and performing the fifth and sixth steps if the pattern is not correctly detected at the sixth step and storing the binarization level in order to set the second division ratio in the fourth step based on the binarization level if the pattern is correctly detected at the sixth step. The apparatus therefor is constructed to carry out the method.

6 Claims, 5 Drawing Sheets

BINARIZING METHOD AND APPARATUS THEREFOR

BACKGROUND OF THE INVENTION

The present invention relates to a binarizing method and apparatus therefor to be carried out before the position of a position correcting mark or that of a circuit pattern placed on a substrate is recognized by an image processing apparatus in semiconductor processing equipment.

In recent years, it has become necessary to align a substrate and a mask with each other in a projecting/exposure apparatus used in semiconductor processing equipment. To this end, a method of recognizing the position of a position correcting mark has been conventionally carried out by means of a pattern such as an image without making contact with the position correcting mark.

The above-described conventional binarizing method used to recognize the position of the position correcting mark or that of the circuit pattern is described below with reference to FIG. 3.

FIG. 3 is a descriptive view of the binarizing method in which the density of an image picked up by a television camera is expressed by frequency distribution.

If an object is a position correcting mark placed on a substrate and the density of the mark is higher than that of the substrate serving as the background surface, the frequency distribution has two mountains in which the mountain having the higher density indicates the density distribution of the mark and the mountain having the lower density indicates the density distribution of the substrate.

FIG. 4 is a construction view showing a conventional position recognizing apparatus used to carry out the conventional method.

An illuminating device 3 is installed at a position diagonally above an object 2, placed on a positioning table 1, having a predetermined pattern which is to be recognized. A television camera 5 is installed on a movable television camera supporting section 4 so that the television camera 5 picks up the image of the object 2. The television camera 5 is connected with a television camera control circuit 7 for controlling the operation of the television camera 5 in response to an instruction supplied from an operation panel and a controller through a decision control circuit (CPU) 6. The apparatus further comprises a window frame control circuit 8 for setting a range to be processed according to an object and an A/D conversion circuit 9 for converting an analog value of a video signal outputted from the television camera 5 into a digital value.

A binarizing apparatus 10 surrounded by a dotted line in FIG. 4 comprises a maximum/minimum density detecting circuit 11 for detecting the maximum density fmax and the minimum density fmin in the processing range of an image to be binarized; a division level ratio storing circuit 12 for storing a division level ratio $\alpha$ in dividing a density histogram in the processing range into two regions; a division level calculating circuit 13 for calculating a division level INiTBiN based on the division level ratio $\alpha$; a representative density calculating circuit 14 for calculating the average density Ml and Mu of each of the two regions of the density histogram divided by the division level INiTBiN; a binarization level ratio storing circuit 15 for storing a binarization level ratio $\beta$ in determining a binarization level BiN; a binarization level calculating circuit 16 for calculating the binarization level BiN based on the binarization level ratio $\beta$; a position recognizing circuit 18 for binarizing the image based on the determined binarization level BiN and then detecting the predetermined pattern of the image by means of template matching based on the binarized image and recognizing the position thereof; and a binarization level control circuit 17 for alterably setting the binarized level BiN by a predetermined density when the predetermined pattern is not recognized.

The binarizing method to be carried out by the apparatus of the above construction is described below with reference to a flowchart of FIG. 5.

First, at step 1, the maximum/minimum density detecting circuit 11 detects the maximum density fmax and the minimum density fmin in the processing range of the image picked up by the television camera 5. At step 2, the division level calculating circuit 13 takes a frequency distribution (density histogram) of the density and divides the density histogram into two regions based on the predetermined division ratio $\alpha$ stored in the division level ratio storing circuit 12. A threshold to be used in dividing the density histogram into the two regions is called a division level. The division level INiTBiN is found by the following equation 1:

Division value level
$$\text{INiTBiN} = \text{fmin} + \alpha \times (\text{fmax} - \text{fmin}) \tag{1}$$

Of the two regions thus obtained, the region of the smaller density is denoted by A and the region of the greater density is denoted by B. At step 3, the representative density calculating circuit 14 calculates the average densities Ml and Mu which are the representative density of each region.

$$\begin{aligned}
&\text{Average density } Ml \text{ of region } A = \\
&\qquad \frac{\sum_{f < \text{INiTBiN}} N(f) \times f}{\sum_{f < \text{INiTBiN}} N(f)} \\
&\text{Average density } Mu \text{ of region } B = \\
&\qquad \frac{\sum_{f > \text{INiTBiN}} N(f) \times f}{\sum_{f > \text{INiTBiN}} N(f)}
\end{aligned} \tag{2}$$

In the above equation 2, N(f) denotes a frequency when density level is (f).

At step 4, using the average densities Ml and Mu and the binarization level ratio $\beta$ previously set and stored in the binarization level ratio storing circuit 15, the binarization level calculating circuit 16 determines the binarization level BiN as follows:

$$\text{Binarization level BiN} = Ml + \beta(Mu - Ml) \tag{3}$$

At step 5, the position recognizing circuit 18 binarizes the image by using the binarization level BiN thus determined, thereby recognizing the position of the pattern.

If the position of the pattern is correctly recognized, the binarization level BiN is appropriate. If the position of the pattern is not correctly recognized, the binarization level BiN is inappropriate. At that time, at step 6, the binarization level control circuit 17 alters the binarization level BiN by the predetermined density and the position recognizing circuit 18 binarizes the image based on the altered binarization level BiN and thus recognizes the position of the pattern until the position of the pattern is correctly recognized. If the position of the pattern is not correctly recognized notwithstanding the repeated alteration of the binarization level BiN, it is decided that the binarization level BiN is not inappropriate, but that the state of the object is inappropriate.

However, according to the above-described conventional method, in an apparatus in which chemical reactions, for example, semiconductor processes take place, the states of circuit boards are chemically varied lot by lot and as a result, and the characteristic of the density histogram of an image such as a position recognizing pattern or mark nonlinearly changes. Therefore, it is necessary to alter the binarization level many times and consequently much time is required for image processing.

SUMMARY OF THE INVENTION

It is an essential object of the present invention to provide method and apparatus, for binarizing an image in a short period of time, which are carried out to recognize the position of a pattern such as an image even though the characteristic of the density distribution of the image changes.

In accomplishing this and other objects of the present invention, according to one aspect of the present invention, there is provided a binarizing method for converting an image picked up by a television camera into a binary image based on a binarization level used as a threshold, comprising:

a first step of finding a maximum value and a minimum value of a density of the image picked up;

a second step of creating a histogram of the density of the image and dividing the histogram into a first region and a second region based on the maximum and minimum values of the density of the image and a predetermined first division ratio;

a third step of calculating an average density of each of the first region and the second region;

a fourth step of deciding a binarization level based on the average density of each of the first and second regions and a second division ratio;

a fifth step of binarizing the image based on the binarization level obtained in the fourth step;

a sixth step of detecting a pattern by means of a binarized image obtained in the fifth step; and a seventh step of altering the binarization level by a predetermined degree and performing the fifth and sixth steps if the pattern is not correctly detected at the sixth step and storing the binarization level in order to set the second division ratio in the fourth step based on the binarization level if the pattern is correctly detected at the sixth step.

According to another aspect of the present invention, there is provided a binarizing apparatus for converting an image picked up by a television camera into a binary image based on a binarization level used as a threshold, comprising:

a maximum/minimum density detecting means for finding a maximum value and a minimum value of a density of the image picked up;

a histogram creating and dividing means for creating a histogram of the density of the image and dividing the histogram into a first region and a second region based on the maximum and minimum values of the density of the image and a predetermined first division ratio;

an average density calculating means for calculating an average density of each of the first region and the second region;

a binarization level calculating means for deciding a binarization level based on the average density of each of the first and second regions and a second division ratio;

an image binarizing means for binarizing the image based on the binarization level obtained in the binarization level calculating means;

a pattern detecting means for detecting a pattern by means of a binarized image obtained in the image binarizing means; and a binarization level control means for altering the binarization level by a predetermined degree and performing operations of the image binarizing means and the pattern detecting means if the pattern is not correctly detected in the pattern detecting means and storing the binarization level in order to set the second division ratio in the binarization level calculating means based on the binarization level if the pattern is correctly detected in the pattern detecting means.

According to the method and apparatus of the present invention, a parameter necessary for initializing a binarization level to be used for binarization is updated to an optimum value by using a binarization level which has been effective for recognizing the position of an image. Compared with the conventional method of using a parameter determined in accordance with a predetermined value unrelated to the current state of an object, even though the state of an object changes and as a result, the characteristic of the density distribution of the image thereof is varied, the parameter can be set to a level very close to the binarization level effective for recognizing the pattern when the binarization level is initialized. Therefore, it is not necessary to alter binarization levels as often as is necessary in the conventional method.

BRIEF DESCRIPTION OF THE DRAWINGS

These and other objects and feature of the present invention will become apparent from the following description taken in conjunction with the preferred embodiments thereof with reference to the accompanying drawings, in which.

DETAILED DESCRIPTION OF THE INVENTION

Figure 1:
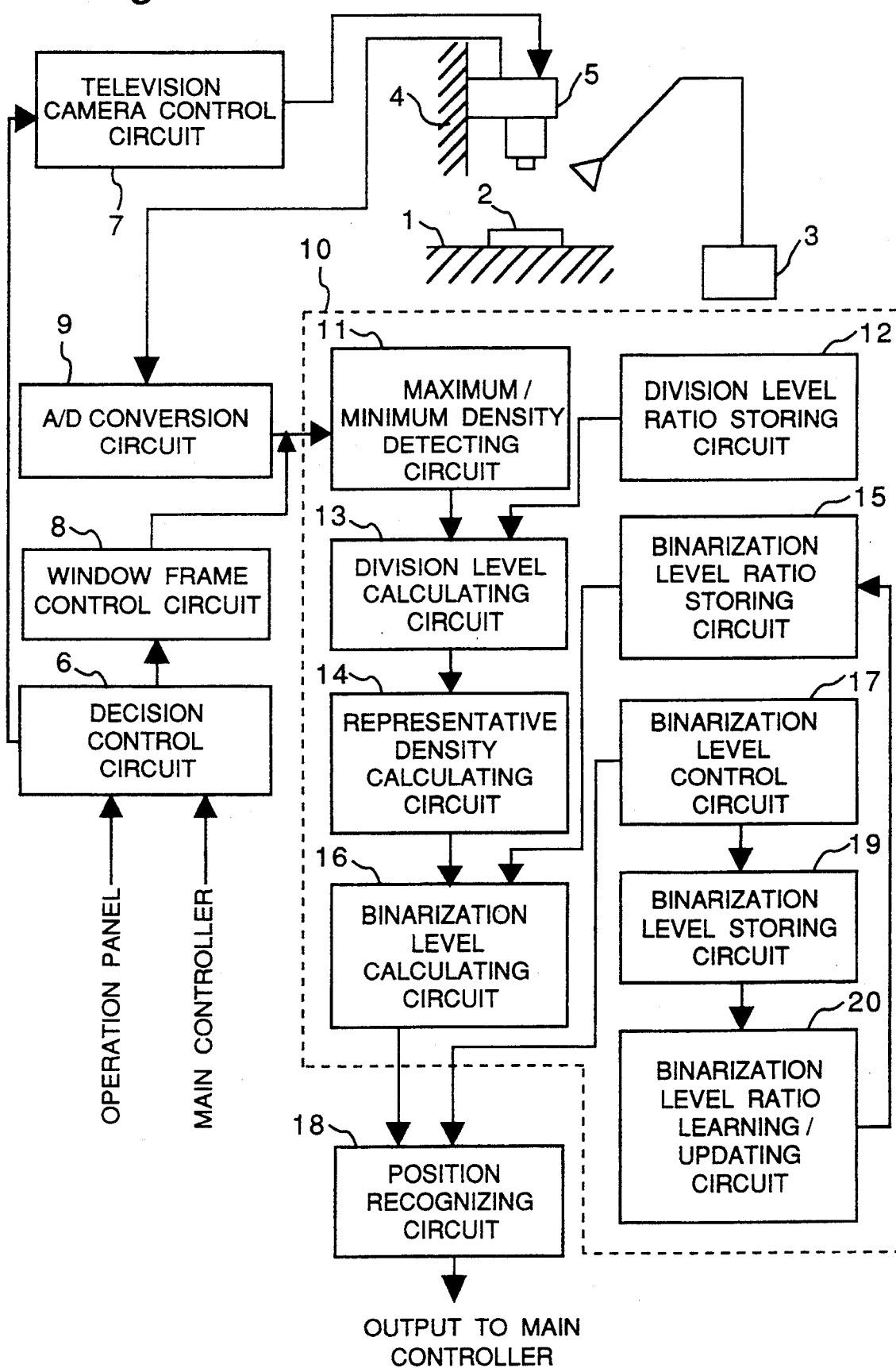
FIG. 1 is a construction view showing a position recognizing apparatus for carrying out a binarizing method according to an embodiment of the present invention.

Before the description of the present invention proceeds, it is to be noted that like parts are designated by like reference numerals throughout the accompanying drawings.

FIG. 1 is a construction view showing a position recognizing apparatus which carries out the binarizing method of one embodiment of the present invention as a preprocessing of the position recognition of an image.

In addition to the circuits of the conventional position recognizing apparatus, the apparatus of the embodiment of the present invention comprises a binarization level storing circuit 19 for storing a binarization level used for binarization when the position of the image has been correctly recognized and a binarization level ratio learning/updating circuit 20 for finding a binarization level ratio by performing an inverse calculation based on the binarization level stored in the binarization level storing circuit 19 and registering the calculated binarization level ratio in a binarization level ratio storing circuit 15.

The binarizing method to be carried out by the apparatus is described below with reference FIGS. 1, 2, and 3.

Figure 2:
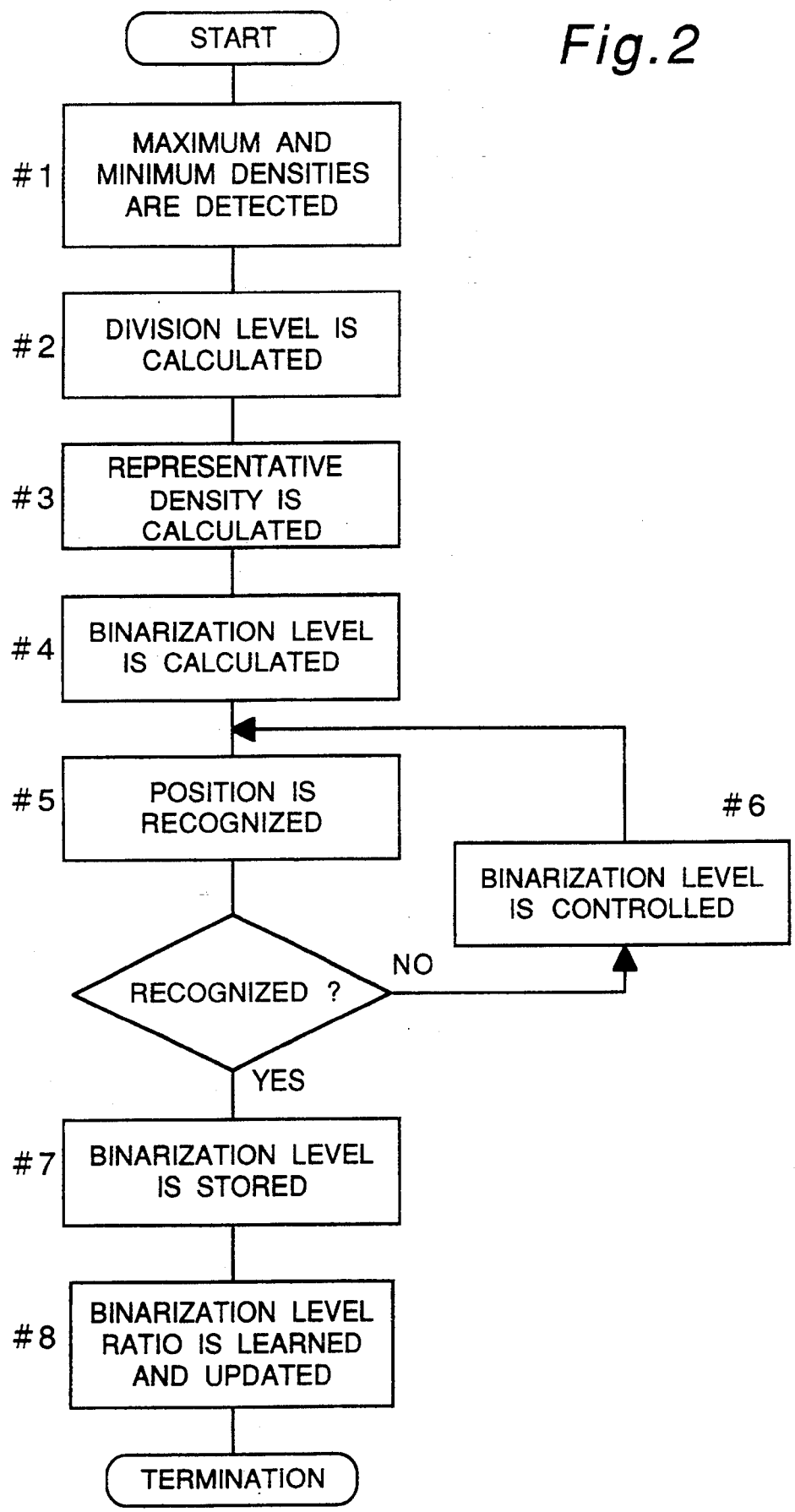
FIG. 2 is a flowchart for describing the binarizing method according to an embodiment of the present invention.
Figure 3:
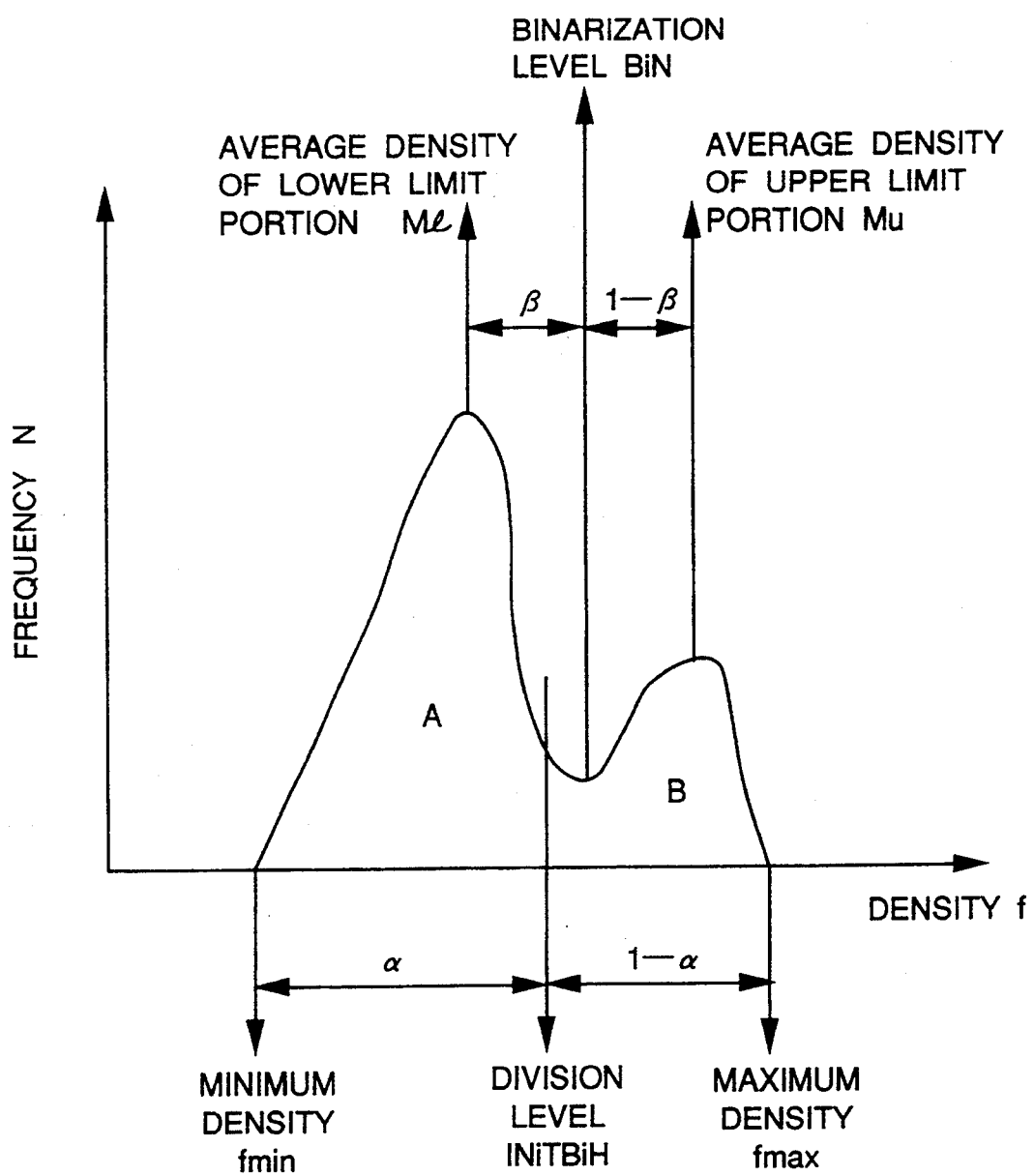
FIG. 3 is a descriptive view for describing the binarizing method of the embodiment.
Figure 4:
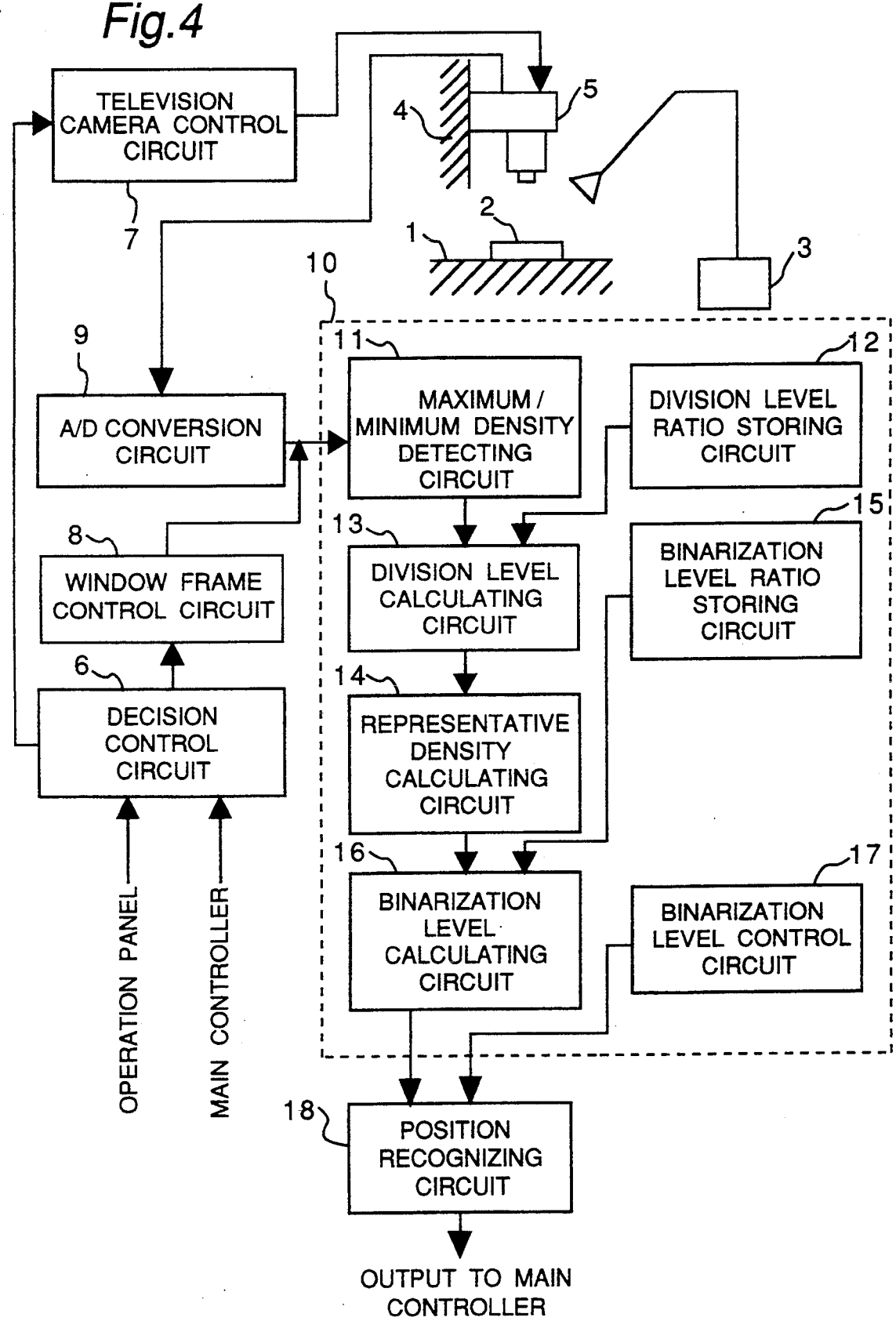
FIG. 4 is a construction view showing a conventional position recognizing apparatus.
Figure 5:
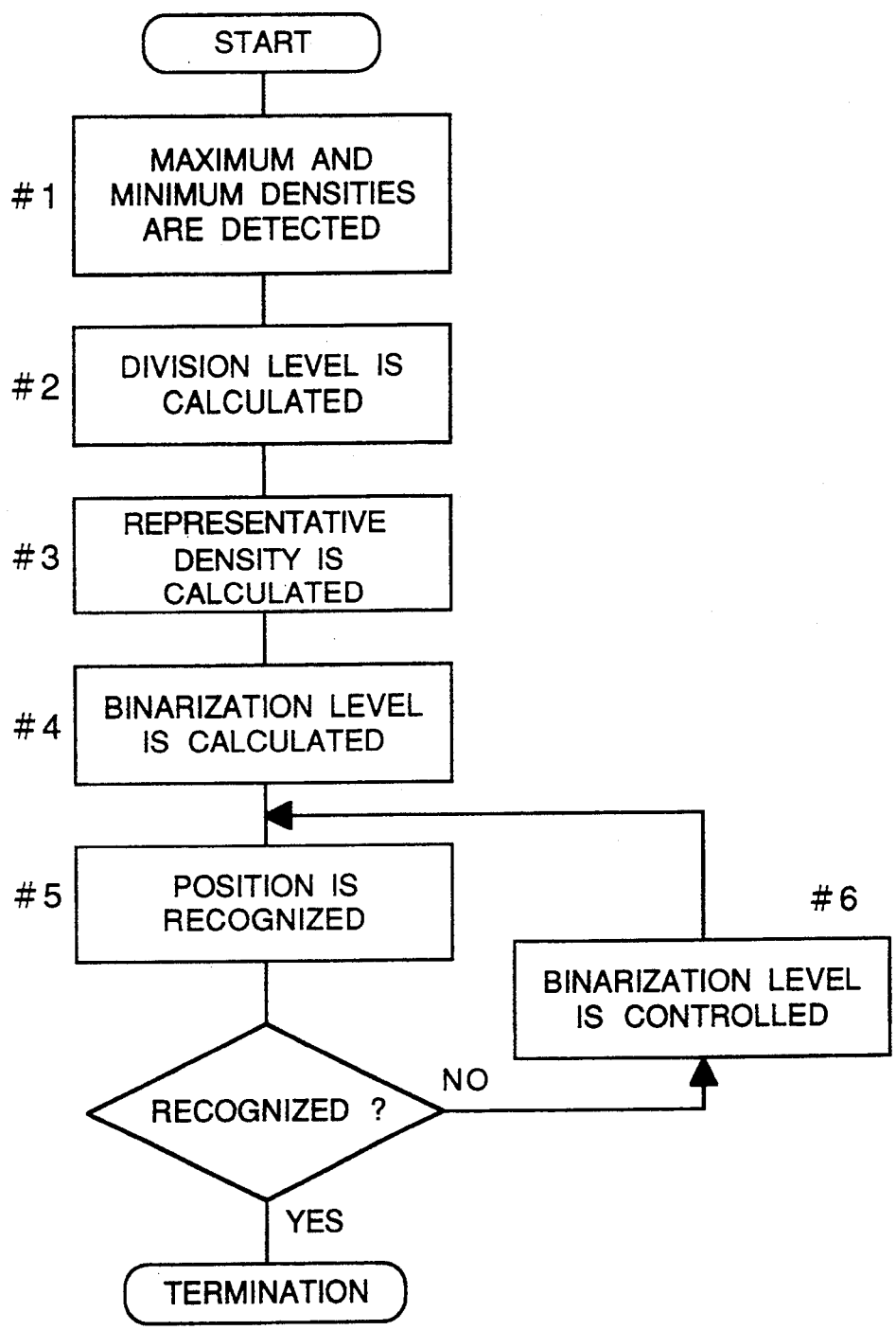
FIG. 5 is a flowchart for describing a conventional binarizing method.

FIG. 2 is a flowchart showing the binarizing method of the embodiment. Similarly to the conventional art, at step 1, the maximum/minimum density detecting circuit 11 detects the maximum density fmax and the minimum density fmin in the processing range of an image picked up by the television camera 5. At step 2, utilizing equation 1 previously described, the division level calculating circuit 13 calculates a division level based on the detected maximum density fmax and the detected minimum density fmin and the division level ratio $\alpha$ stored in the division level ratio storing circuit 12. Then, at step 3, the histogram of the density of a pattern is considered. That is, using equation 2, the representative density calculating circuit 14 calculates the average density Ml of the region A and that Mu of the region B with the division level INiTBiN set as the boundary between the regions A and B as shown in FIG. 3. At step 4, using equation 3, the binarization level calculating circuit 16 decides a binarization level BiN based on the calculated average density and the binarization level ratio $\beta$. At step 5, the position recognizing circuit 18 recognizes the position of the pattern, i.e., the position recognizing circuit 18 binarizes the pattern by using the calculated binarization level and then, executes template matching. If the template matching fails to recognize the pattern, the position recognizing circuit 18 performs template matching repeatedly until it detects the pattern or alters template matching a predetermined number of times (range) by altering the decided binarization level BiN.

The method according to the embodiment greatly differs from the conventional method in that at step 4, the binarization level ratio $\beta$ is not predetermined but updated based on previous data.

That is, using a binarization level Bnew which has been effective for recognizing a pattern, the binarization level ratio learning/updating circuit 20 calculates and updates the binarization level ratio $\beta$ from equation 4 which is modified equation 3. That is:

$$\beta = \frac{BiN - Ml}{Mu - Ml} \quad (4)$$

As the binarization level Bnew which has been effective for recognizing a pattern, either the following 1 or 2 is used:

(1) binarization level used when the images of the latest object has been correctly recognized.

(2) average value of binarization levels used when the images of objects before the current object have been correctly recognized.

In the selection of the binarization levels (1) and (2), for example, when there is a difference between the last and current binarization levels larger than a predetermined value, the binarization level (1) is appropriate. When there is not such a difference between them, the binarization level (2) is appropriate.

As a result, the binarization level(s) which has been used when a pattern has been correctly recognized is learned and updated. Even though the state of an object changes and as a result, the characteristic of the density distribution of the image thereof is varied, a binarization level close to the binarization level effective for recognizing the pattern can be obtained when the binarization level is initialized. Therefore, it is not necessary to alter binarization levels as often as done in the conventional method so as to recognize the pattern correctly.

According to the binarizing method of the embodiment, a binarization level ratio which is to be used in initializing a binarization level is calculated based on a binarization level which has been effective for recognizing a pattern. Thus, data previously used are learned and updated. Even though the state of an object changes and as a result, the characteristic of the density distribution of the image thereof is varied, a binarization level close to the binarization level effective for recognizing the pattern can be obtained when the binarization level is initialized. Therefore, it is not necessary to alter binarization levels as often as in the conventional method so as to recognize the pattern correctly. That is, the image can be binarized in a short period of time.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A binarizing method for converting an image picked up by a television camera into a binary image based on a binarization level used as a threshold, comprising:

a first step of finding a maximum value and a minimum value of a density of the image picked up;

a second step of creating a histogram of the density of the image and dividing the histogram into a first region and a second region based on the maximum and minimum values of the density of the image and a predetermined first division ratio;

a third step of calculating an average density of each of the first region and the second region;

a fourth step of deciding a binarization level based on the average density of each of the first and second regions and a second division ratio;

a fifth step of binarizing the image based on the binarization level obtained in the fourth step;

a sixth step of detecting a pattern by means of a binarized image obtained in the fifth step; and a seventh step of altering the binarization level by a predetermined degree and performing the fifth and sixth steps if the pattern is not correctly detected at the sixth step and storing the binarization level in order to set the second division ratio in the fourth step based on the binarization level if the pattern is correctly detected at the sixth step.

2. The binarizing method as defined in claim 1, wherein in the fourth step, a last stored binarization level from among all stored binarization levels which have been effective for binarizing the image is selectively used as the binarization level.

3. The binarizing method as defined in claim 1, wherein in the fourth step, an average value of stored binarization levels which have been effective for binarizing the image is used as the binarization level.

4. A binarizing apparatus for converting an image picked up by a television camera into a binary image based on a binarization level used as a threshold, comprising:

a maximum/minimum density detecting means for finding a maximum value and a minimum value of a density of the image picked up;

a histogram creating and dividing means for creating a histogram of the density of the image and dividing the histogram into a first region and a second region based on the maximum and minimum values of the density of the image and a predetermined first division ratio;

an average density calculating means for calculating an average density of each of the first region and the second region;

a binarization level calculating means for deciding a binarization level based on the average density of each of the first and second regions and a second division ratio;

an image binarizing means for binarizing the image based on the binarization level obtained in the binarization level calculating means;

a pattern detecting means for detecting a pattern by means of a binarized image obtained in the image binarizing means; and a binarization level control means for altering the binarization level by a predetermined degree and performing operations of the image binarizing means and the pattern detecting means if the pattern is not correctly detected in the pattern detecting means and storing the binarization level in order to set the second division ratio in the binarization level calculating means based on the binarization level if the pattern is correctly detected in the pattern detecting means.

5. The binarizing apparatus as defined in claim 4, wherein in the binarization level calculating means, a last stored binarization level from among all stored binarization levels which have been effective for binarizing the image is selectively used as the binarization level.

6. The binarizing apparatus as defined in claim 4, wherein in the binarization level calculating means, an average value of stored binarization levels which have been effective for binarizing the image is used as the binarization level.

* * * * *